(12) United States Patent
Elio

(10) Patent No.: US 6,330,994 B1
(45) Date of Patent: Dec. 18, 2001

(54) ADJUSTABLE SUPPORT APPARATUS AND ARCHITECTURE FOR ADJUSTING SUPPORT APPARATUS

(75) Inventor: Paul A. Elio, Phoenix, AZ (US)

(73) Assignee: Elio Engineering, Phoenix, AZ (US)

( * ) Notice: Subject to any disclaimer, the term of this patent is extended or adjusted under 35 U.S.C. 154(b) by 0 days.

(21) Appl. No.: 09/551,986

(22) Filed: Apr. 15, 2000

Related U.S. Application Data

(63) Continuation of application No. 09/092,675, filed on Jun. 5, 1998, now Pat. No. 6,070,938.

(51) Int. Cl.[7] .................................................. B60N 2/06
(52) U.S. Cl. .................. 248/429; 248/430; 297/216.18; 297/344.1
(58) Field of Search ................................. 248/429, 430; 297/216.18, 344.1

(56) References Cited

U.S. PATENT DOCUMENTS

| | | | |
|---|---|---|---|
| 2,346,895 | * | 4/1944 | Bergman ..................... 297/216.18 X |
| 3,022,976 | * | 2/1962 | Zia .............................. 297/216.18 X |
| 5,100,092 | * | 3/1992 | Sovis ..................................... 248/429 |
| 5,516,071 | * | 5/1996 | Miyauchi ............................. 248/429 |
| 5,785,387 | * | 7/1998 | Hernandez et al. ............. 248/429 X |
| 5,957,535 | * | 9/1999 | Pasternak et al. ............... 248/429 X |
| 6,000,757 | * | 12/1999 | Sovis .................................... 248/430 |

* cited by examiner

Primary Examiner—Anthony D. Barfield
(74) Attorney, Agent, or Firm—Parsons & Goltry; Robert A. Parsons; Michael W. Goltry

(57) ABSTRACT

Adjustable support apparatus comprising a support structure including a first seating element and a pivotally attached second seating element each for receiving a selected portion of a body of a user thereon, a rack and pinion adjustment assembly fixed to the support structure for reciprocally adjusting the support structure and a belt and drum adjustment assembly fixed to the support structure for pivotally adjusting the second seating element.

7 Claims, 13 Drawing Sheets

ADJUSTABLE SUPPORT APPARATUS AND ARCHITECTURE FOR ADJUSTING SUPPORT APPARATUS

This application is a continuation, of application Ser. No. 09/092,675, filed Jun. 5, 1998 now U.S. Pat. No. 6,070,938.

FIELD OF THE INVENTION

This invention relates generally to the field of support apparatus and, more particularly, to improved adjustable support apparatus and improved architecture for effecting adjustment of support apparatus.

BACKGROUND OF THE INVENTION

The relative comfort and safety of vehicle driver and passenger seats depends largely on the skeletons or frameworks defining the shape and form of the seats and the adjustment mechanisms for allowing the seats to be adjusted to accommodate users of varying size. Although current frameworks prove exemplary for accommodating comfort and safety, current adjustment assemblies continually fail to withstand the rigors of everyday use and often succumb to the loads normally occasioned in vehicular accidents which often contributes or exacerbates driver and/or passenger injury.

Accordingly, it would be highly desirable to provide improved adjustable support apparatus and an improved architecture for effecting adjustment of support apparatus.

It is a provision of the present invention to increase the safety and comfort of vehicular driver and passenger seats such as those found in automobiles, airplanes, boats, etc.

It is another provision of the present invention to increase the ease and efficiency of adjusting adjustable support apparatus.

It is still another purpose of the present invention to provide new and improved adjustable support apparatus that is easy to construct.

It is a further purpose of the present invention to provide new and improved adjustable support apparatus that is inexpensive.

It is still a further purpose of the present invention to provide a new and improved rack and pinion adjustment assembly for adjusting body-supporting apparatus in reciprocal directions.

It is yet still a further purpose of the present invention to provide a new and improved belt and drum adjustment assembly for adjusting a body-supporting element of body supporting apparatus in pivotal directions.

It is another purpose of the present invention to provide a new and improved rack and pinion adjustment assembly for adjusting body-supporting apparatus in reciprocal directions that can withstand extreme loading conditions such as commonly experienced in vehicular accidents and which has substantially no chuck.

It is still another purpose of the present invention to provide a new and improved belt and drum adjustment assembly for adjusting a body supporting element of body supporting apparatus in pivotal directions that can withstand extreme loading conditions such as commonly experienced in vehicular accidents and which has substantially no chuck.

It is yet still another provision of the present invention to reduce vehicle driver and passenger injuries that normally occur from vehicular accidents.

SUMMARY OF THE INVENTION

The above problems and others are at least partially solved and the above purposes and others are realized in adjustable support apparatus and an improved architecture for adjusting support apparatus. In a particular embodiment, adjustable support apparatus of the present invention may comprise a first element, a second element mounted with the first element for movement in reciprocal directions and a support structure fixed to the second element, the support structure for receiving a selected portion of a body of a user thereon.

The present invention may further include a first adjustment assembly for permitting adjustment of support structure at selected positions along reciprocal traverse thereof. In particular, the first adjustment assembly comprises a rack carried by one of the first and second elements, gears carried by the other one of the first and second elements for rotation and in meshing engagement with the rack, and means for moving one of the gears between a first location detached from another one of the gears for permitting movement of one of the first and second elements in reciprocal directions and a second location meshingly engaged with the other one of the gears for inhibiting movement of the one of the first and second elements in reciprocal directions. The means for moving the gears may comprise a shaft mounted with the other one of the first and second elements for movement in reciprocal directions substantially parallel to the rack, a second shaft mounted with the other one of the first and second elements for movement in reciprocal directions in substantial opposition to the rack, and a lever coupled with the first and second shafts and movable in pivotal directions for moving the first and second shafts in reciprocal directions for effecting movement of the one of the gears between the first and second locations.

The present invention may also further include a second adjustment or clamp assembly for permitting adjustment of a backrest or second seating element of the support structure at selected positions along pivotal traverse thereof. In particular, the clamp assembly may comprise the second element having a drum with the backrest or second seating element carried by the drum for pivotal movement, and clamp apparatus carried by the second seating element and the base and movable between first and second orientations for releasing the second seating element from the drum to permit pivotal movement of the second seating element, and securing the second seating element against the drum to inhibit pivotal movement of the second seating element.

Clamp apparatus may comprise elongate flexible apparatus coiled about the second seating element at the drum, and means for moving the elongate flexible apparatus to secure the second seating element against the drum and to release the second seating element from the drum. The means for moving the elongate flexible apparatus to secure the second seating element against the drum and to release the second seating element from the drum may comprise a fixture carried by the base for movement in reciprocal directions in substantial opposition to the drum, portions of the elongate flexible apparatus being carried by the fixture, and means for moving the fixture in reciprocal directions for moving the elongate flexible apparatus to secure the second seating element against the drum and to release the second seating element from the drum. The means for moving the fixture in reciprocal directions may further include a lever mounted with the base for pivotal movement and with the fixture, the lever movable in pivotal directions for effecting movement of the fixture in reciprocal directions.

BRIEF DESCRIPTION OF THE DRAWINGS

The foregoing and further and more specific objects and advantages of the instant invention will become readily apparent to those skilled in the art from the following detailed description thereof taken in conjunction with the drawings in which.

DETAILED DESCRIPTION OF A PREFERRED EMBODIMENT

The present invention provides, among other things, improved adjustable support apparatus and an improved architecture for effecting adjustment of support apparatus. Forthcoming embodiments of the present invention prove exemplary for use in support apparatus of a type comprising driver and passenger seats found in vehicles such as automobiles, boats, airplanes, etc.

Figure 1:
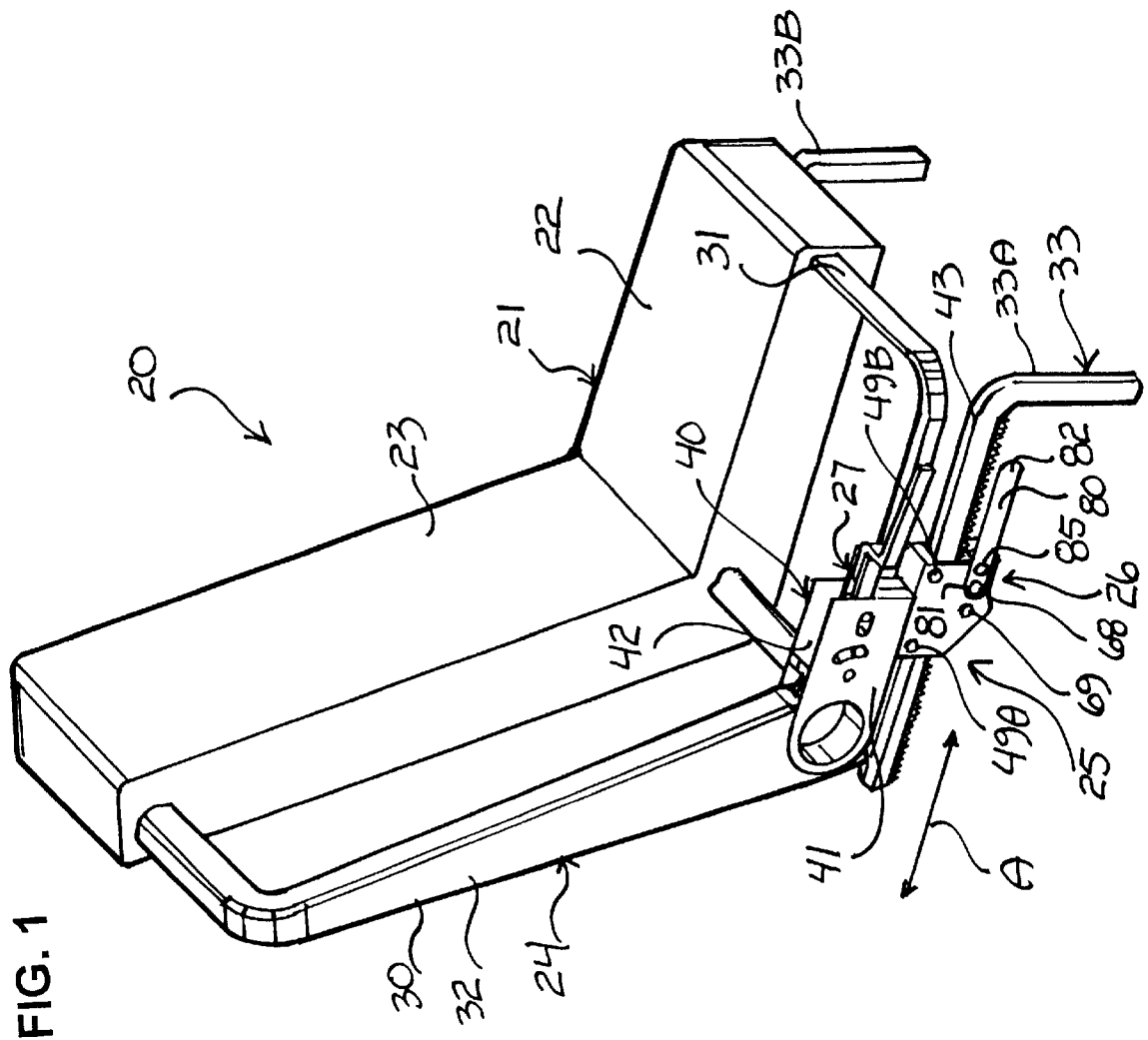
FIG. 1 illustrates an isometric view of adjustable support apparatus with portions thereof being broken away illustrating a skeleton and an architecture fixed to the skeleton, the architecture including a first adjustment assembly for adjusting adjustable support apparatus in reciprocal directions and a second adjustment assembly for adjusting a body supporting element of adjustable support apparatus in pivotal directions.

Turning now to the drawings, in which like reference characters indicate corresponding elements throughout the several views, attention is first directed to FIG. 1 illustrating an isometric view of adjustable support apparatus generally designated by the reference character 20. Apparatus 20 generally comprises a support structure 21 including a first seating element 22 and a pivotally attached second seating element 23. The first seating element 22 is operative for receiving a selected portion of a body of a user thereon and, more particularly, the buttocks of a user thereon in a seated position. Furthermore, the second seating element 23 is operative for receiving a selected portion of a body of a user thereagainst and, more particularly, portions of a back of a user thereagainst in a seated position. With continuing reference to FIG. 1, portions of support structure 21 are shown broken away exposing a skeleton 24 operative for providing structural support for support structure 21 and an architecture 25 fixed to skeleton 24. Architecture 25 includes a first adjustment assembly 26 for providing movement of support structure in reciprocal directions and a second adjustment or clamp assembly 27 for providing movement of second seating element 23 in pivotal directions.

Preferably constructed of a substantially rigid material such as a selected metal or the like, skeleton 24 is comprised generally of a framework 30 including a first framework 31 contained by first seating element 22 and a second framework 32 contained by second seating element 23. First and second frameworks 31 and 32 each include a substantially U-shaped configuration, although other shapes and forms may be used if so desired. Architecture 25 is fixed to first framework 31 and to second framework 32 at a point generally where first and second frameworks 31 and 32 intersect. Architecture 25 is in turn fixed to a stand 33 operative for supporting support structure 21 above a supporting surface, for permitting movement and adjustment of support structure 21 in reciprocal directions relative stand 33 and for permitting movement and adjustment of second seating element 23 in pivotal directions. Because apparatus 20 is especially useful as a seat for a vehicle such as an automobile, airplane, etc., stand 33 may be fixed to a supporting surface of the vehicle such as with bolts or other suitable mechanical fastening mechanism. As shown in FIG. 1, stand 33 comprises spaced-apart first and second stand elements 33A and 33B. Although not shown, first framework 31 may be coupled to second stand element 33B via a conventional carriage assembly for permitting movement of first framework 31 over second stand element 33B in reciprocal directions.

Figure 3:
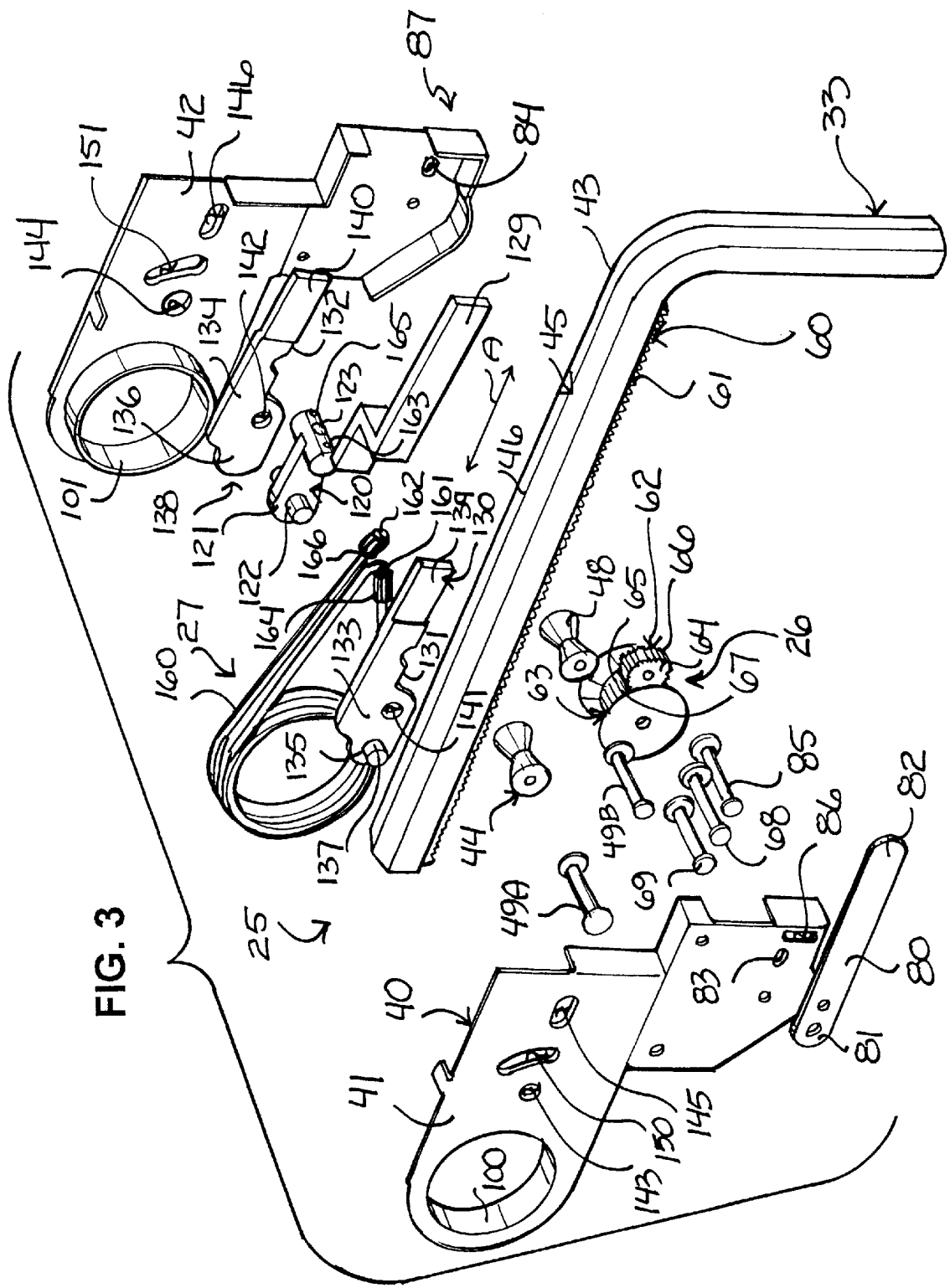
FIG. 3 illustrates an exploded isometric view of the architecture of FIG. 1.

Turning to FIG. 3 illustrating an exploded isometric view of architecture 25 of FIG. 1, architecture 25 comprises a housing or base 40 including opposing first and second base sections 41 and 42 each being substantially the mirror image of the other. First and second base sections 41 and 42 may be fixed together as shown in FIG. 1 to capture stand so as to be carried by portions of stand 33 for movement in reciprocal directions and, more particular, to capture elongate element 43 of stand element 33A so as to be carried by elongate element 43 for movement in reciprocal directions as generally indicated by the double arrowed line A shown in FIGS. 1 and 3. In accordance with a preferred embodiment, elongate element 43 is preferably constructed of substantially rigid solid stock material or of substantially rigid closed tubular stock.

For the purposes of orientation, elongate element 43 is generally intended to be considered a first element of a reciprocal motion apparatus of the present invention, and base 40 is generally intended to be considered a second element of a reciprocal motion apparatus of the present invention, further details of each to be set forth throughout the ensuing discussion.

First and second base sections 41 and 42 are each preferably constructed of aluminum, titanium, steel or other similar substantially rigid material. In this regard, first and second base sections 41 and 42 may be secured together by conventional welding techniques or by, for instance, a plurality of fasteners each of which may comprise a nut and bolt engagement assembly, a rivet or other similar form of mechanical fastening mechanism.

With continuing reference to FIG. 3, base 40 carries a carriage 44 that rides along and against a track 45 of elongate element 43. Carriage 44 and track 45 cooperate to guide and allow base 40 to move in reciprocal directions along substantially the entire length of elongate element 43. In this specific example, track 45 includes a pitched surface 46 and carriage 44 includes wheels 47 and 48 carried by and between first and second base sections 41 and 42 for rotation, wheels 47 and 48 operative for effecting wheeled movement of base 40 along track 45. Wheels 47 and 48 may, for instance, be rotatably journaled to housing 40 or as shown in the embodiment set forth in FIG. 3, each rotatably carried by a shaft 49A and 49B, respectively, fixed to or otherwise supported or carried by first and second base sections 41 and 42.

Figure 5:
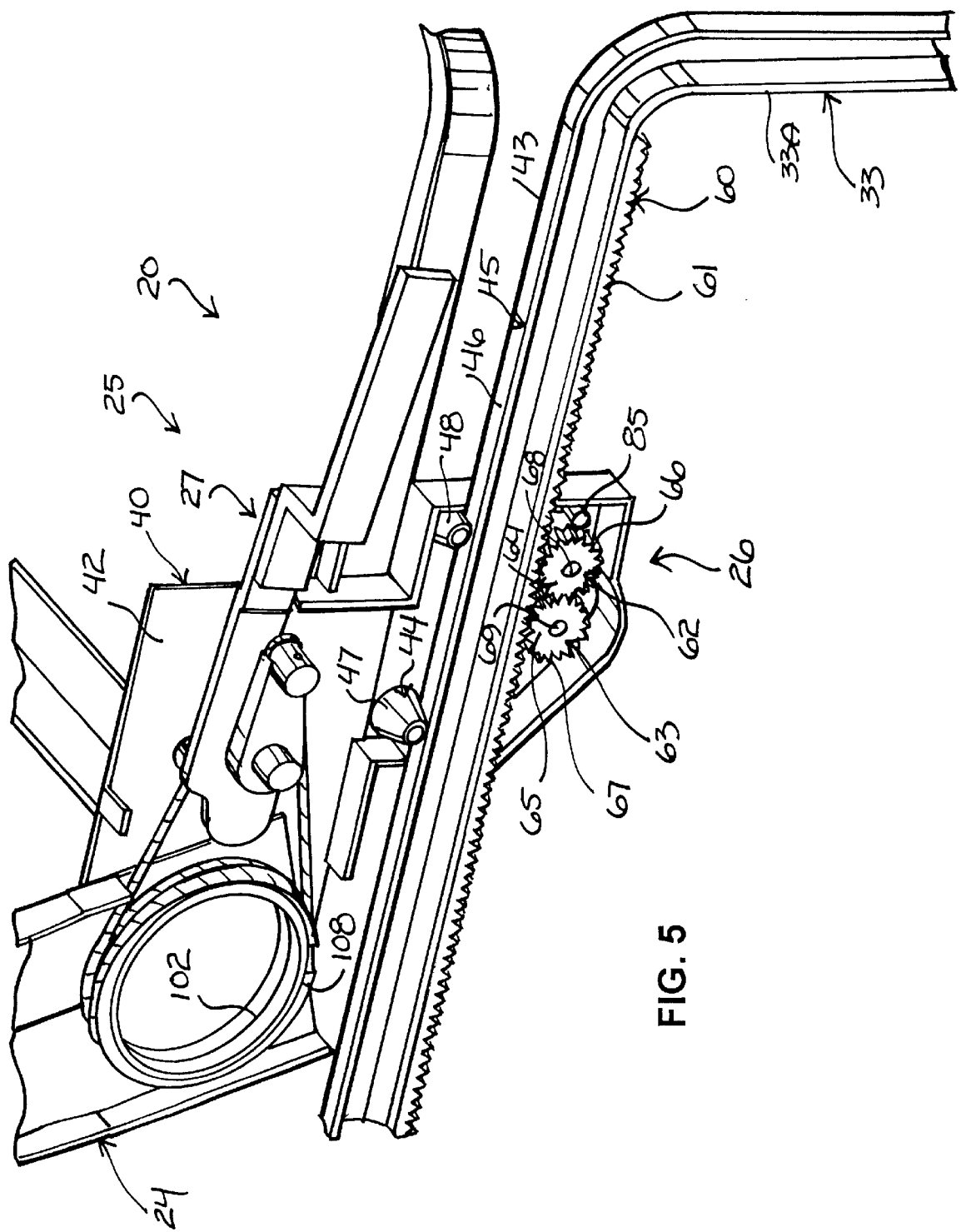
FIG. 5 illustrates a view very similar to the view of FIG. 4 with portions of the skeleton and architecture broken away for the purposes of illustration.

Regarding first adjustment assembly 26, architecture 25 further includes a rack 60 carried by elongate element 43 opposite track 45, rack 60 comprising a toothed body 61 extending along substantially the entire length of elongate element 43. Further included are gears 62 and 63 comprising first and second pinions 64 and 65 each having teeth 66 and 67, respectively. With additional attention directed to FIG. 5, first and second pinions 64 and 65 are each carried by base 40 in series, for rotation and in constant meshing engagement of teeth 66 and 67, respectively, with rack 60. In the specific embodiment shown in FIGS. 3 and 5, first and second pinions 64 and 65 are each rotatably carried by a shaft 68 and 69, respectively, fixed to or otherwise supported or carried by first and second base sections 41 and 42 (first base section 41 not shown in FIG. 5).

As previously intimated, first and second pinions 64 and 65 are carried by base 40 and supported in constantly meshing engagement with rack 60. First pinion 64 is movable between a first location spaced or otherwise detached from second pinion 65 as shown substantially in FIGS. 6 and 8, and a second location meshingly engaged with second pinion 65 as shown substantially in FIGS. 7 and 9.

Figure 6:
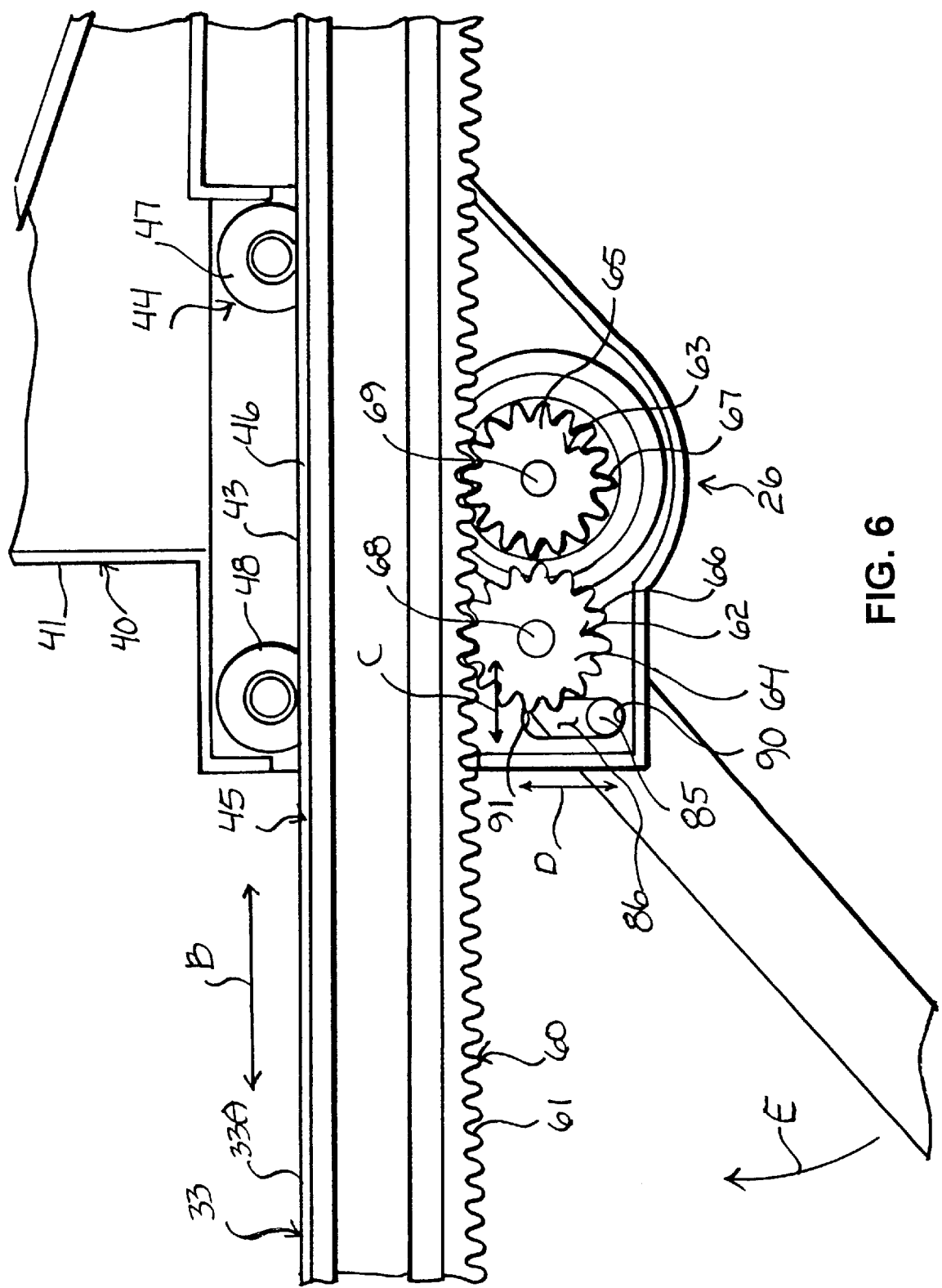
FIG. 6 illustrates a side elevational view of the first adjustment assembly of FIG. 1 shown as it would appear in an unlocked orientation.
Figure 8:
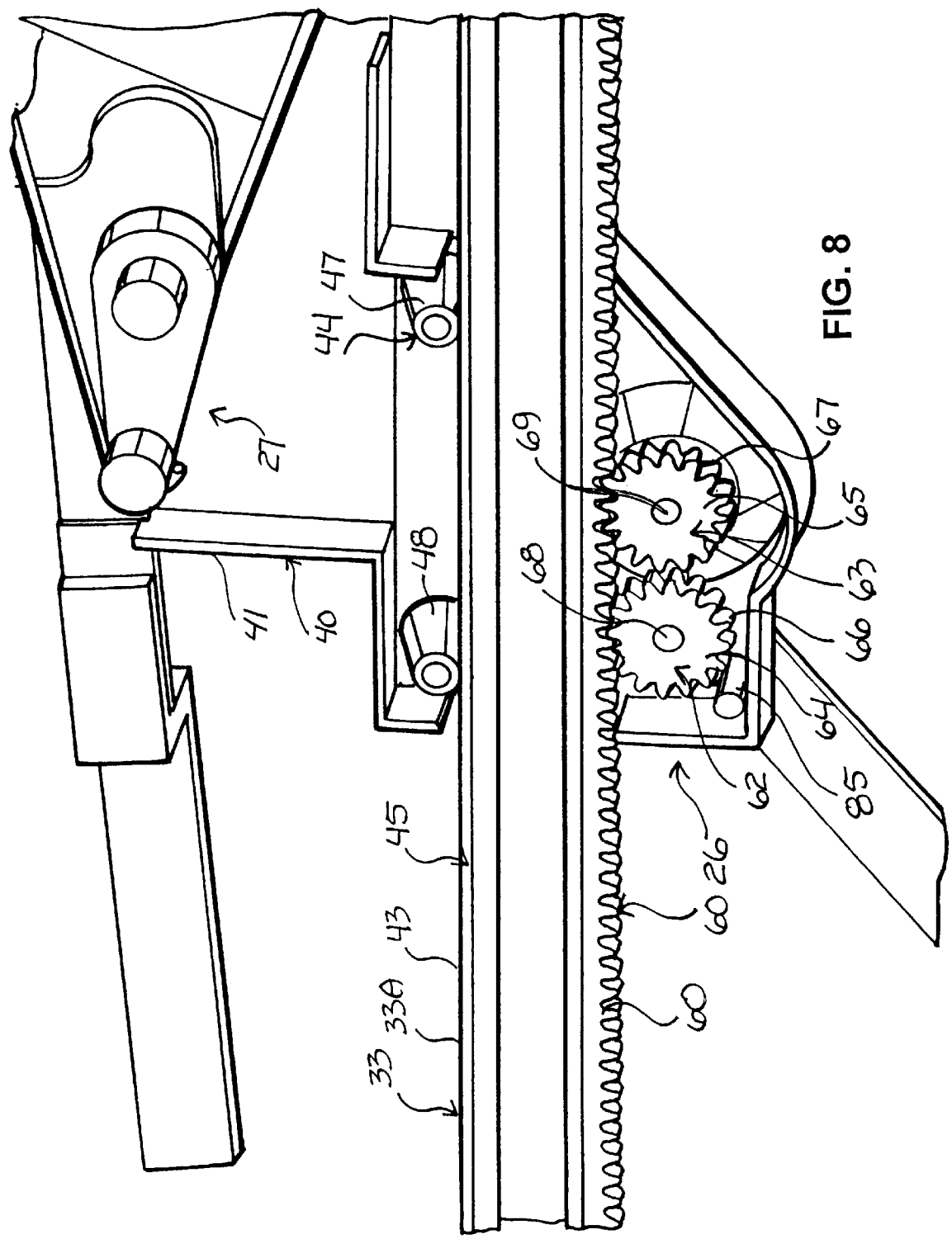
FIG. 8 illustrates an isometric view of the first adjustment assembly of FIG. 1 shown as it would appear in an unlocked orientation.

In the first location of first pinion 64 spaced or otherwise detached from second pinion 65 as shown in FIGS. 6 and 8, first and second pinions 64 and 65 each may rotate independently of the other thus permitting movement of housing 40 in reciprocal directions along elongate element 43 as generally indicated by the double arrowed line B. With support structure 21 fixed to architecture 25 and, more particularly, to base 40 of architecture 25 as shown substantially in FIG. 1, movement of base 40 in reciprocal directions effects adjustment of support structure 21 in reciprocal directions. Although not specifically shown, fixation of base 40 to support structure 21 and, more particularly, to first framework 31, may be carried out with conventional mechanical fastening apparatus such as nut and bolt engagement apparatus or rivets, or perhaps by conventional welding techniques.

Figure 7:
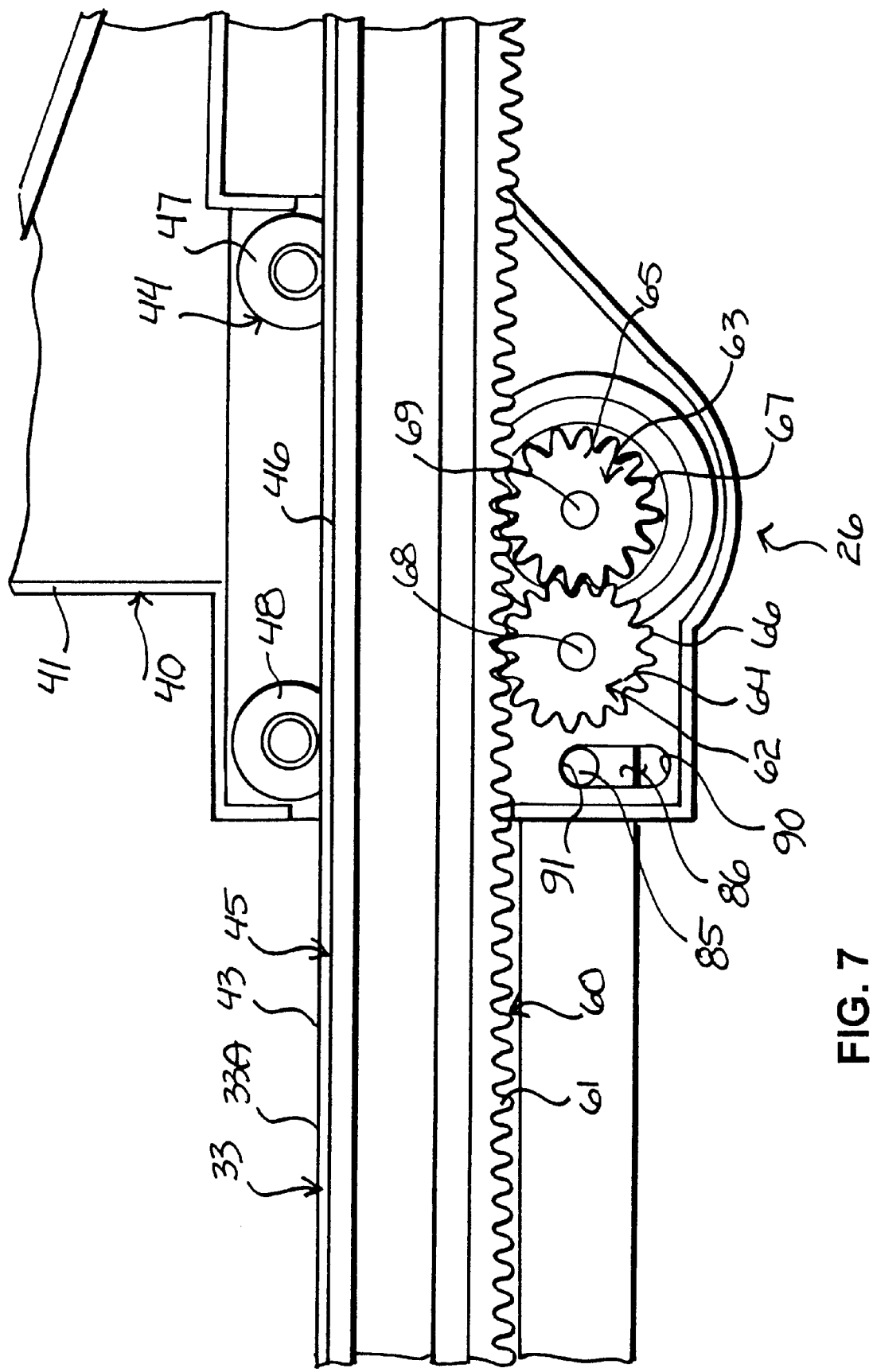
FIG. 7 illustrates another side elevational view of the first adjustment assembly of FIG. 1 shown as it would appear in a locked orientation.
Figure 9:
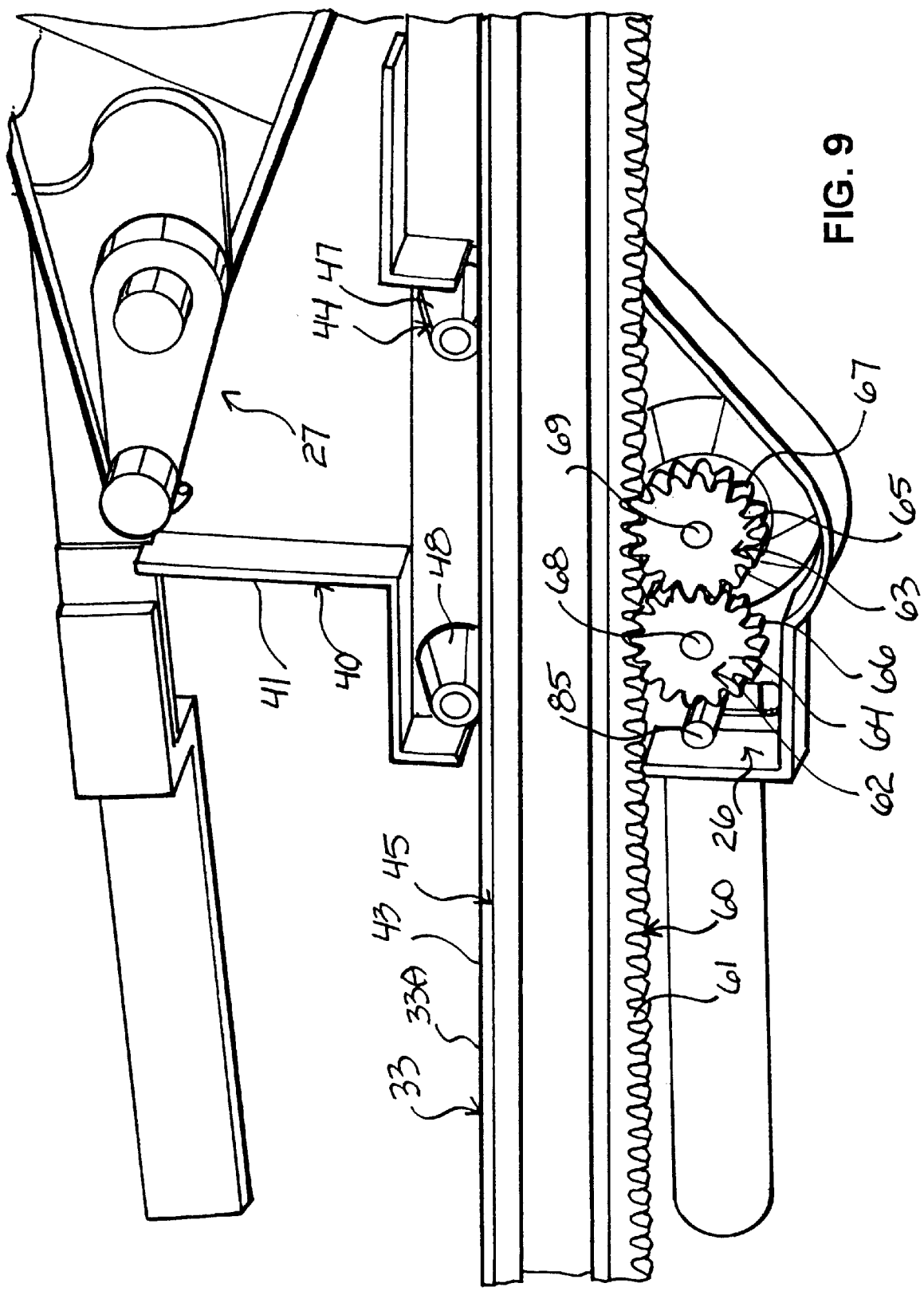
FIG. 9 illustrates another isometric view of the first adjustment assembly of FIG. 1 shown as it would appear in a locked orientation.

In the second location of first pinion 64 meshingly engaged with second pinion 65 as shown in FIGS. 7 and 9, and with first and second pinions 64 and 65 meshingly engaged with rack 60, first and second pinions 64 and 65 are prevented from rotating and running along rack 60. As such, rack 60 and first and second pinions 64 and 65 cooperate together to lock base 40 in place in the second position of first pinion 64. Because apparatus 20 proves exemplary as a vehicular seat, movement of first pinion 64 between the first and second locations permits adjustment of support structure 21 in reciprocal directions as desired and permits support structure 21 to be secured in place at selected positions along substantially the entire length of elongate element 43.

Figure 4:
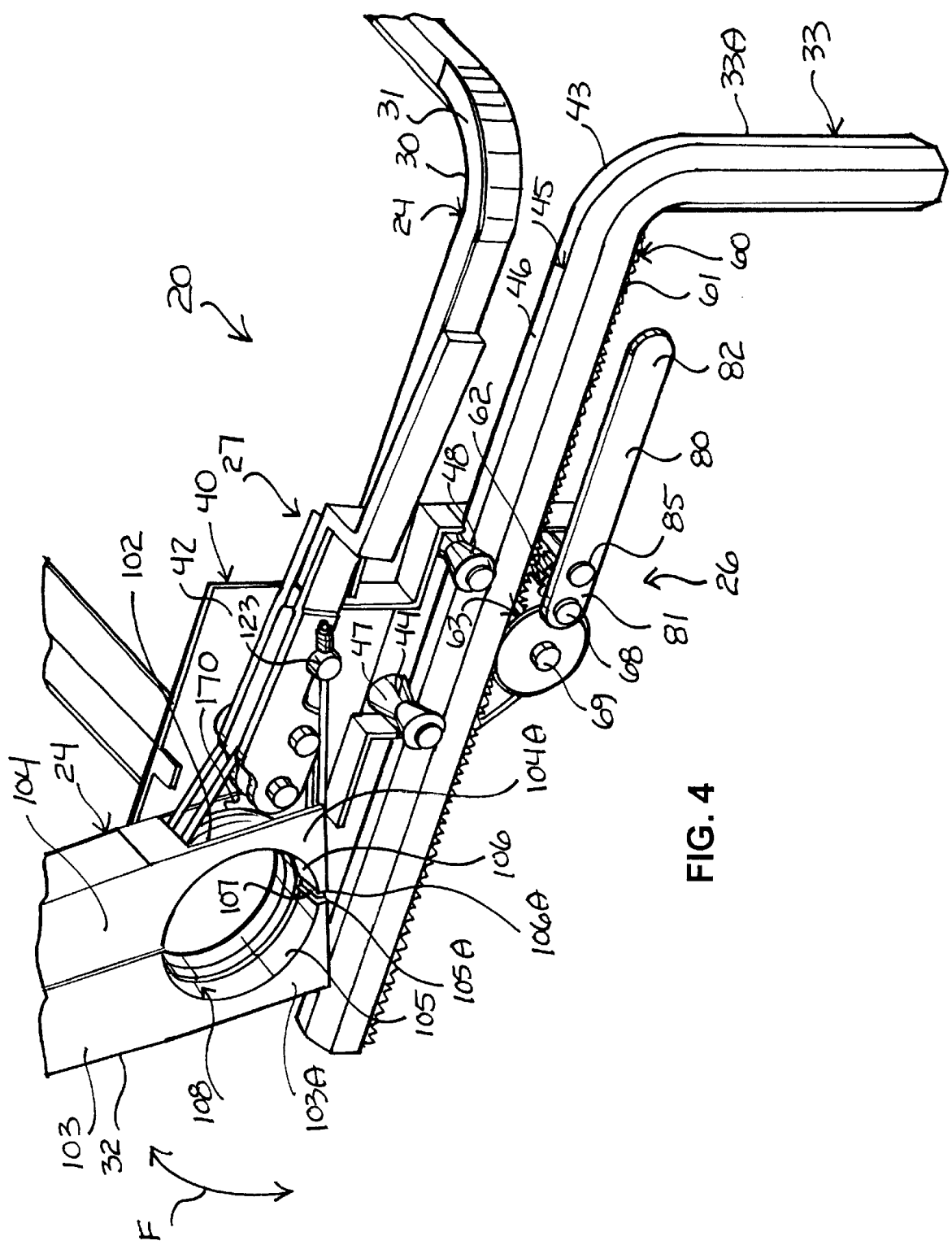
FIG. 4 illustrates a fragmented isometric view of the skeleton and architecture of FIG. 1.

To effect movement of first pinion 64 between the first and second locations, and with attention directed back to FIG. 3 and additional reference to FIG. 4, architecture 25 further includes a lever 80 having an end 81 coupled with an end of shaft 68 outboard of first base section 41 of housing 40 (shown in FIG. 1) and a free end 82 extending outwardly therefrom. As evinced in FIG. 6, shaft 68 is preferably mounted for movement in reciprocal directions spaced from and substantially parallel or normal to rack 60 as generally indicated by the double arrowed line C between the first and second locations of pinion 64. To this end, and as shown in FIG. 3, shaft 60 is carried by and extends through a pair of opposed slots 83 and 84 each being substantially elongate and formed through one of first and second base sections 41 and 42, respectively.

Lever 80 is also coupled with an end of a shaft 85 outboard of first base section 41 of housing 40 and intermediate end 81 and free end 82 (shown in FIG. 1), shaft 85 fixed to or otherwise supported or carried by first and second base sections 41 and 42 of housing 40. Shaft 85 is preferably carried by housing 40 for movement in reciprocal directions in substantial opposition to rack 60 as generally indicated by the double arrowed line D in FIG. 6. To this end, and as shown in FIG. 3, shaft 85 is carried by and extends through a pair of opposed slots 86 and 87 each being substantially elongate and formed through one of first and second base sections 41 and 42, respectively, in substantial opposition to rack 60.

In operation, lever 80 may be grasp, such as by a human hand, and moved along pivotal traverse about shaft 68 and 8 and a second position as shown substantially in FIGS. 7 and 9. In the first position of lever 80 as generally evinced in FIG. 6, shaft 85 is positioned against a distal end 90 (only one shown in combination with slot 86) of each slot 86 and 87 that corresponds to the first location of first pinion 64. Upon movement of lever 80 along lateral pivotal traverse about shaft 68 in the direction generally indicated by arcuate arrowed line E in FIG. 6, shaft 85 will travel toward rack 60 bearing against slots 86 and 87. Movement of shaft 85 toward rack 60 will cause shaft 68 and first pinion 64 to move toward shaft 69 and second pinion 65 to meshingly engage first pinion 64 with second pinion 65. Continued movement of lever 80 along lateral pivotal traverse about shaft 68 in the direction generally indicated by arcuate arrowed line E will cause shaft 85 to abut against a proximal end 91 of each slot 86 and 87 (proximal end 91 shown only in combination with slot 86) corresponding to the second location of first pinion 64 in meshing engagement with second pinion 65.

With shaft 85 constrained for reciprocal movement in slots 86 and 87 in substantial opposition to rack 60, and with shaft 68 constrained for reciprocal movement in slots 83 and 84 substantially normal to rack 60, movement of lever 80 between the first and second positions will cause shaft 85 to pull and push first pinion 64 between: (1) the first location for permitting movement of support structure 21 in reciprocal directions along substantially the entire length of elongate element 43 as desired; and (2) the second location of first pinion 64 locking support structure 21 in place. The rack 60 and first and second pinions 64 and 65 effect exemplary reciprocal adjustment of support structure 21 and provide for an aggressive and very strong locking assembly for locking support structure 21 in place at selected positions along substantially the entire length of elongate element 43.

Figure 2:
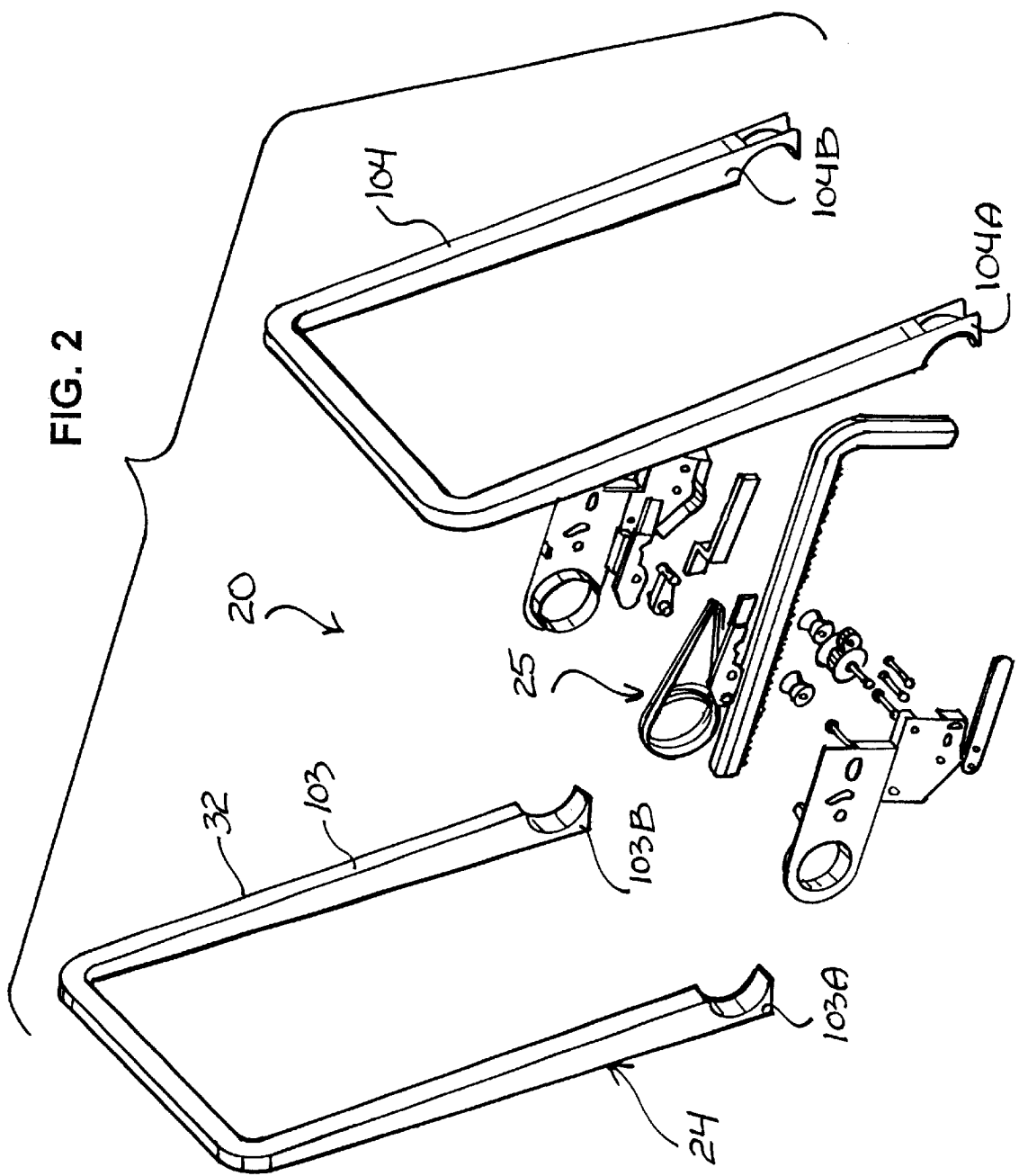
FIG. 2 illustrates an exploded isometric view of portions of the skeleton and architecture of FIG. 1.

Regarding second adjustment assembly 27, each one of the first and second base sections 41 and 42 of architecture 25 further include opposing drum sections 100 and 101. With first and second base sections 41 and 42 coupled together, drum sections 100 and 101 come together and cooperate to form a drum 102 shown generally in substantial vertical cross section in FIG. 5. Turning to FIG. 2 illustrating an exploded isometric view of portions of skeleton 24 and architecture 25, second framework 32 includes opposing substantially U-shaped elements 103 and 104 that sandwich together to form framework 32, each one of elements 103 and 104 having first and second free ends 103A and 103B, and 104A and 104B, respectively, first free ends 103A and 104A opposing one another and second free ends 103B and 104B opposing one another. Elements 103 and 104 may be coupled together by welding or with conventional mechanical fasteners such as rivets or nut and bolt engagement assemblies.

In accordance with a preferred embodiment, one of either opposing first free ends 103A and 104A and second free ends 103B and 104B may be coupled to housing 40 and, more particularly, to drum 102 for movement in pivotal directions. To this end, and with attention directed to FIG. 4, opposing first free ends 103A and 104A may define opposing substantially arcuate jaws 105 and 106 that when brought together, loosely capture drum 102 as shown substantially in FIG. 4 forming a secondary drum 108 substantially surrounding drum 102, with opposing distal ends 105A and 106A of jaws 105 and 106 forming an end gap 107 therebetween. The loose capture of drum 102 by secondary drum 108 permits pivotal movement of second framework 32 in pivotal directions as generally indicated by the arcuate arrowed line F in FIG. 4.

To lock or otherwise secure second framework 32 in a fixed position, and with attention directed back to FIG. 3, second adjustment assembly 27 of the present invention may further include a fixture 120 comprising a body 121 that carries first and second axles 122 and 123 in spaced-apart and substantially parallel relation. Further included is a lever 130 including first and second lever elements 131 and 132 each being substantially the mirror image of one another, and a handle 129. In this regard, first and second lever elements 131 and 132 each include a body 133 and 134, an end 135 and 136 that carries an outwardly extending pin 137 and 138, a free end 139 and 140, and an aperture 141 and 142 formed therethrough intermediate free end 139 and 140 and end 135 and 136, respectively.

Fixture 120 and lever 130 cooperate together and are both captured by housing 40, lever 130 being available for receiving selected force for imparting movement to fixture 120. In particular, first and second lever elements 131 and 132 may be brought together to sandwich fixture 120 therebetween and receive free ends of first axle 122 each into and through one of apertures 141 and 142 permitting fixture 120 to move in pivotal directions in apertures 141 and 142 about first axle 122. Free ends of first axle 122 also extend into and through arcuate slots 150 and 151 formed through first and second base sections 41 and 42, respectively. Pins 137 and 138 admit into and through opposing apertures 143 and 144 formed through first and second base sections 41 and 42, respectively, spaced forward of arcuate slots 150 and 151 permitting first and second lever elements 131 and 132 to pivot about pins 137 and 138, respectively. Furthermore, free ends of second axle 123 of fixture 120 admit into and through opposing elongated slots 145 and 146 formed through first and second base sections 41 and 42, respectively, permitting fixture not only to move in pivotal directions about second axis 123 but also in reciprocal directions. Free ends 139 and 140 of first and second lever elements 131 and 132 capture therebetween an end 147 of handle 129 of which are fixed thereto such as by welding, rivets, nut and bolt engagement assemblies or other mechanical fastening apparatus.

With continuing reference to FIG. 3, second adjustment assembly 27 further includes an elongate flexible apparatus or element 160 having free ends 161 and 162 fixed to or otherwise carried by second axle 123 in spaced relation. In a preferred embodiment, elongate flexible element 160 includes a wound metallic cord or the like. With attention directed to FIG. 4, free end 161 of elongate flexible element 160 extends into and through an aperture 163 (shown in FIG. 3) formed through second axle 123 as is coupled with or otherwise fixed to an enlargement 164 securing free end 161 with second axle 123. Although not specifically shown, free end 162 of elongate flexible element 160 also extends through an aperture 165 (FIG. 3) formed through second axle 123 spaced from aperture 163 and is fixed to an enlargement 166 (FIG. 3) securing free end 162 with second axle 123.

With attention directed to FIG. 4, elongate flexible element 160 extends outwardly from second axle 123 toward drum 102 and into and through an opening 170 formed in U-shaped element 104 at free end 104A. Elongate flexible element 160 coils about secondary drum 108, extends outwardly from opening 170 and wraps around second axle 123 as shown substantially in FIG. 11. From second axle 123, elongate flexible element 160 extends outwardly therefrom and into and through opening 170. Elongate flexible element 160 then coils about secondary drum 108, extends outwardly from opening 170 terminating with free end 162 fixed to second axle 123.

The assemblage of elongate flexible element 160 and secondary drum 108 provide the means for permitting pivotal adjustment of second framework 32 and for securing second framework 32 at selected positions along pivotal traverse thereof as desired. In this regard, free ends 161 and 162 of elongate flexible element 160 may be moved generally from a first position toward secondary drum 108 to loosen coiled portions of elongate flexible element 160 from secondary drum 108, and a second position away from secondary drum 108 to tighten coiled portions of elongate flexible element 160 against secondary drum 108. In the first position of free ends 161 and 162, the loose coiling of elongate flexible element 160 about secondary drum 108 permits jaws 105 and 106 of secondary drum to relax to loosely engulf drum 102 thereby permitting selected pivotal adjustment of second framework 32 at drum 102. In the second position of free ends 161 and 162, tight coiling of elongate flexible element 160 about secondary drum 108 draws jaws 105 and 106 inwardly substantially enclosing end gap 107 and causing jaws 105 and 106 of secondary drum 108 to grippingly engage drum 102 securing second framework 32 in place.

Figure 10:
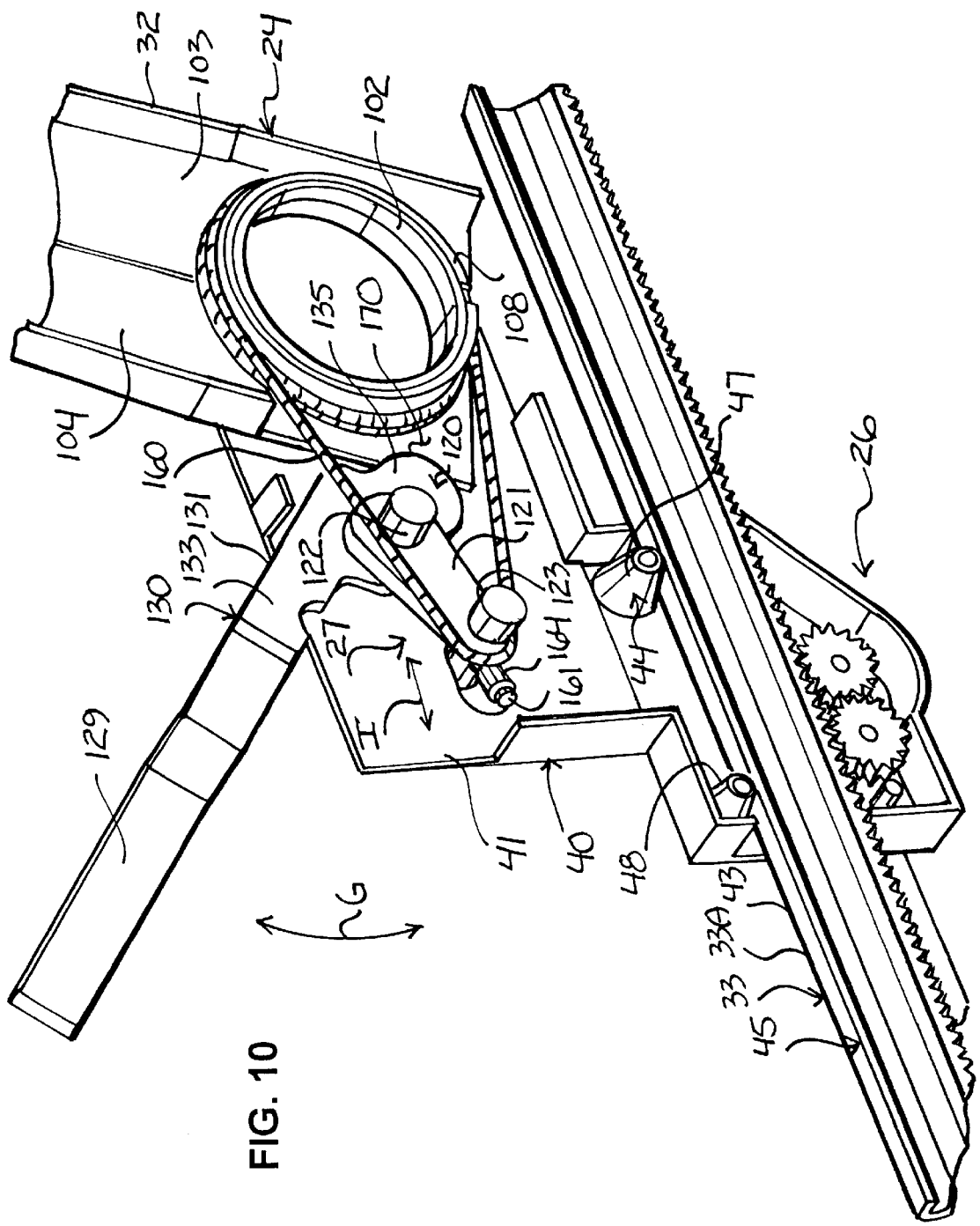
FIG. 10 illustrates an isometric view of the second ad assembly of FIG. 1 shown as it would appear in a locked orientation.
Figure 11:
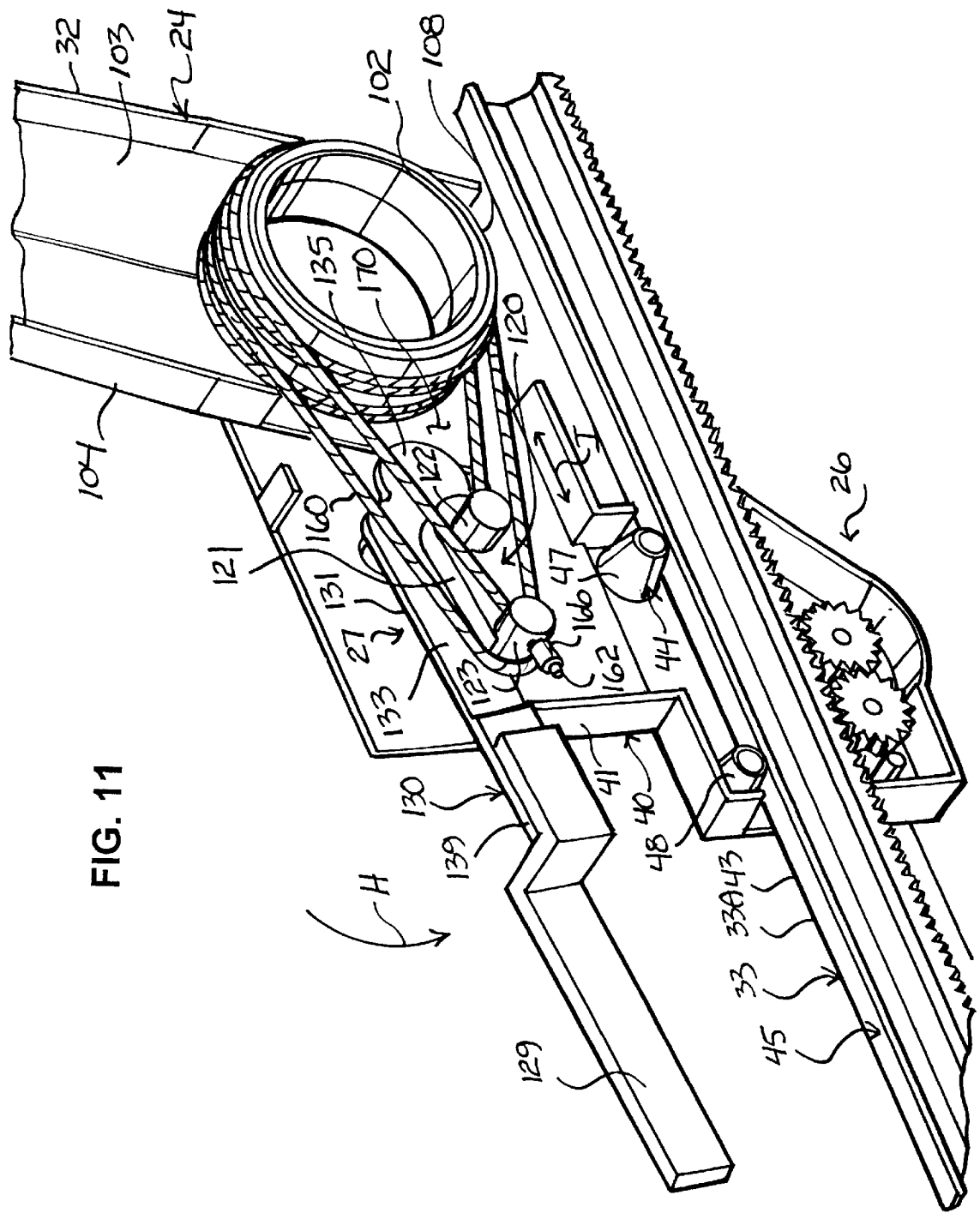
FIG. 11 illustrates another isometric view of the second adjustment assembly of FIG. 1 shown as it would appear in an unlocked orientation.

To effect movement of free ends 161 and 162 of elongate flexible element 160 between the first and second positions for loosening and tightening coiled portions of elongate flexible element about secondary drum 108, lever 130 may be moved along pivotal traverse in directions generally indicated by the arcuate arrowed line G between a first orientation as shown in FIG. 10 corresponding to the first position of free ends 161, and a second orientation as shown in FIG. 11 corresponding to the second position of free ends 161 and 162. In operation of lever 130 in this regard, handle 129 may be grasp, such as by a human hand, and lever 130 moved along pivotal traverse about a fulcrum as defined by pins 137 and 138 a first position as shown in FIG. 10 and a second position as shown in FIG. 11.

In the first position of lever 130 as generally evinced in FIG. 10 with handle 129 shown directed away from stand 33, fixture 120 is shown directed toward drum 102 and secondary drum 108 with second axle 123 and first axle 122 positioned forwardly toward drum 102 and secondary drum 108 proximate, as referenced only in FIG. 3, forward ends 145A and 146A of slots 145 and 146, and forward ends 150A and 151A of slots 150 and 151, respectively. It should be generally understood that forward ends 145A, 146A, 150A and 151A are directed toward drum 102 and secondary drum 108. Furthermore, with fixture 120 positioned toward drum 102 and secondary drum 108, free ends 161 and 162 will be directed toward drum 102 and secondary drum 108 loosening coiled portions of elongate flexible element 160 about jaws 105 and 106 permitting them to relax in a normal loose engagement with drum 102 permitting movement of second framework 32 in pivotal directions at drum 102.

To move lever 130 from the first to the second position, handle 129 may be grasp and moved downwardly toward stand 33 in the direction generally indicated by the arrowed line H in FIG. 11 causing lever 130 to pivot about the fulcrum to push (1) first axle 122 of fixture 120 downwardly and away from drum 102 and secondary drum 108 in grooves 150 and 151 (grooves 150 and 151 shown only in FIG. 3) and (2) second axle 123 of fixture 120 away from drum 102 and secondary drum 108 in grooves 145 and 146 (grooves 145 and 146 shown only in FIG. 3). In the second position of lever 130 as generally evinced in FIG. 11 with handle 129 shown directed toward stand 33, fixture 120 is shown directed away from drum 102 and secondary drum 108 with second axle 123 and first axle 122 positioned rearwardly or away from drum 102 and secondary drum 108 proximate, as referenced only in FIG. 3, rearward ends 145B and 146B of slots 145 and 146, and rearward ends 150B and 151B of slots 150 and 151, respectively. It should be generally understood that rearward ends 145B, 146B, 150B and 151B are directed away drum 102 and secondary drum 108. Furthermore, with fixture 120 positioned away from drum 102 and secondary drum 108, free ends 161 and 162 will be directed away from drum 102 and secondary drum 108 tightening coiled portions of elongate flexible element 160 about jaws 105 and 106 causing them to constrict or tighten against jaws 105 and 106 causing jaws 105 and 106 to grippingly engage drum 102 securing second framework 32 in place. In this regard, selective movement of lever 130 between the first and second positions allows selective movement of fixture 120 in reciprocal directions as generally indicated by the double arrowed line I in FIGS. 10 and 11 and the corresponding adjustment of second framework 32 at selective positions along pivotal traverse thereof.

In summary, the present invention provides an exemplary architecture for facilitating movement of a seat or support structure in reciprocal directions, and movement of a backrest of a seat or support structure in pivotal directions. First and second adjustment assemblies 26 and 27 are easy to operate and each provide aggressive engagement in their locked orientations.

Figure 12:
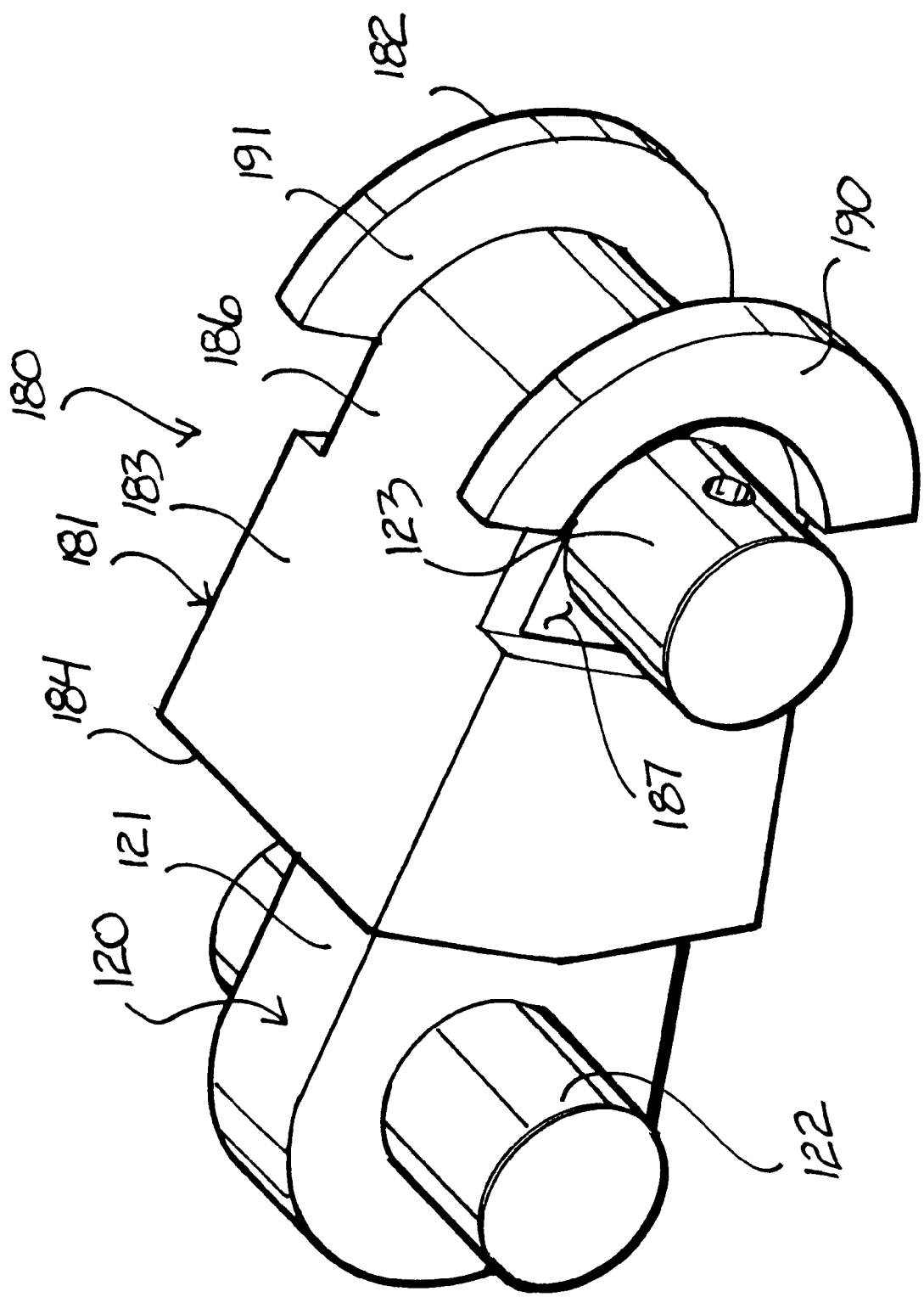
FIG. 12 illustrates an isometric view of a fixture and a cap assembly of the present invention.
Figure 13:
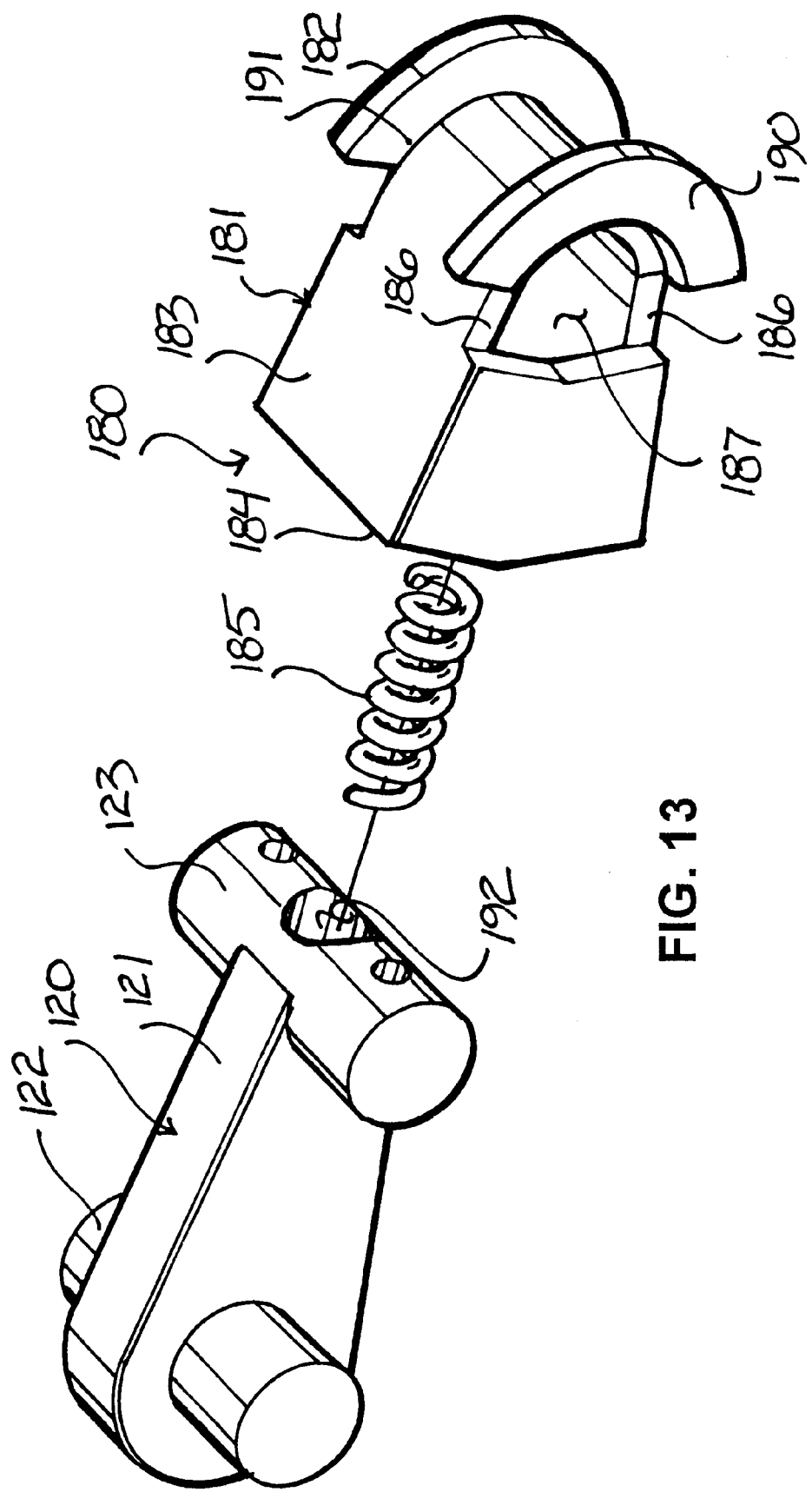
FIG. 13 illustrates an exploded isometric view of the fixture and cap assembly of FIG. 12.

The present invention has been described above with reference to a preferred embodiment. However, those skilled in the art will recognize that changes and modifications may be made in the described embodiments without departing from the nature and scope of the present invention. For instance, because elongate flexible element 160 may tend to stretch somewhat over an extended period of time, fixture 120 may be fitted with a cap assembly 180 as shown in FIG. 12. Cap 180 assembly comprises a cap 181 having a head 182, a continuous sidewall 183 having an open end 184 and a compression spring 185 shown in FIG. 13. Continuous sidewall 183 may be inserted over second axle 123 of fixture 120 in a direction from open end 184 and cap 181 secured to extensions 186 (shown only in FIG. 13) via, for instance, welding to capture compression spring 185 therebetween. Continuous sidewall 183, extensions 186 and head 182 cooperate to form openings 187 (only one shown) through which free ends of second axle 123 extend.

Elongate flexible element 160 may thus be installed to wrap about head 182 of cap assembly 180 adjacent second axle 123. So captured between head 182 and second axle 123, compression spring 185 will operate to impart a normal outwardly bias to cap 181 away from second axle 123 so that during operation of second adjustment assembly 27, any stretching of elongate flexible element 160 will be absorbed by cap assembly 180 for continued and exemplary operation of second adjustment assembly. In accordance with a preferred embodiment of cap assembly 180, head 182 may be provided with spaced-apart opposing sidewalls 190 and 191 for holding and preventing elongate flexible element 160 from slipping off head 182. Furthermore, second axle 123 may be provided with a recess 192 for containing an end of compression spring 185 if so desired as shown in FIG. 11.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

What is claimed is:

1. Seat track apparatus for reciprocal motion comprising:
   a first track element;
   a second track element carried by and encircling the first track element, the second track element including a base having a first section and a second section fixedly and immovably attached together around the first track element by portions of an adjustment mechanism, the adjustment mechanism engaging the first track element to permit relative positioning of the first track element and the second track element and completing the encircling of the first track element whereby lateral separation of the second track element from the first track element is prevented; and
   mounting structure for mounting a seat to one of the first track element and the second track element.

2. Seat track apparatus as claimed in claim 1 wherein the first track element includes an elongated cylindrically shaped member having a lower surface and the adjustment mechanism engages the lower surface.

3. Seat track apparatus as claimed in claim 1 wherein the first track element and the second track element form a tube-in-tube structure.

4. An adjustable seat comprising:
   a seat frame; and
   a pair of spaced apart track assemblies each comprising:
      a first track element;
      a second track element having a fixed and rigid tubular cross section, carried by and encircling the first track element for relative longitudinal movement in reciprocal directions whereby lateral separation of the second track element from the first track element is prevented, the second track element includes a base carrying an adjustment mechanism, the adjustment mechanism engaging the second track element to permit relative positioning of the first track element and the second track element and completing the encircling of the first track element; and mounting structure for mounting the seat frame to one of the first track element and the second track element.

5. An adjustable seat as claimed in claim 4 wherein the base includes a first section and a second section fixedly attached together around the first track element by portions of the adjustment mechanism.

6. An adjustable seat as claimed in claim 5 wherein the first track element includes an elongated member having a lower surface and the adjustment mechanism engages the lower surface.

7. An adjustable seat as claimed in claim 4 wherein the first track element and the second track element form a tube-in-tube structure.

* * * * *

UNITED STATES PATENT AND TRADEMARK OFFICE
CERTIFICATE OF CORRECTION

PATENT NO.     : 6,330,994 B1
DATED          : December 18, 2001
INVENTOR(S)    : Paul A. Elio It is certified that error appears in the above-identified patent and that said Letters Patent is hereby corrected as shown below:

<u>Column 3,</u>
Line 35, delete "ad" and add -- adjustment --.

<u>Column 6,</u>
Line 28, insert -- between a first position as shown substantially in Figs. 6 -- between "68" and "and".

Signed and Sealed this

Eleventh Day of February, 2003

JAMES E. ROGAN
*Director of the United States Patent and Trademark Office*